United States Patent
Maeda et al.

(10) Patent No.: US 7,005,464 B2
(45) Date of Patent: Feb. 28, 2006

(54) WOODY SYNTHETIC RESIN COMPOSITIONS

(75) Inventors: Mutsumi Maeda, Chiba (JP); Masaaki Kondoh, Kanagawa (JP); Noriko Yamauchi, Kanagawa (JP); Mikihiko Ito, Kanagawa (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 10/505,133

(22) PCT Filed: Feb. 19, 2003

(86) PCT No.: PCT/JP03/01808

§ 371 (c)(1),
(2), (4) Date: Aug. 19, 2004

(87) PCT Pub. No.: WO03/070824

PCT Pub. Date: Aug. 28, 2003

(65) Prior Publication Data

US 2005/0154094 A1 Jul. 14, 2005

(30) Foreign Application Priority Data

Feb. 21, 2002 (JP) ............................. 2002-044092
Feb. 21, 2002 (JP) ............................. 2002-044093

(51) Int. Cl.
*C08L 31/04* (2006.01)

(52) U.S. Cl. ..................... 524/35; 524/502; 524/515

(58) Field of Classification Search ................ 524/35, 524/502, 515
See application file for complete search history.

(56) References Cited

U.S. PATENT DOCUMENTS

| 4,286,030 | A | * | 8/1981 | Moore .................. 429/253 |
| 5,082,605 | A | | 1/1992 | Brooks et al. |
| 5,725,939 | A | | 3/1998 | Nishibori |
| 6,153,293 | A | | 11/2000 | Dahl et al. |

FOREIGN PATENT DOCUMENTS

| JP | 10-287760 A | 10/1998 |
| JP | 11-43562 A | 2/1999 |
| JP | 11-269316 A | 10/1999 |
| JP | 11-269326 A | 10/1999 |
| JP | 11-343370 A | 12/1999 |
| JP | 2001-114944 A | 4/2001 |

* cited by examiner

*Primary Examiner*—David W. Wu
*Assistant Examiner*—Mei Q. Huang
(74) *Attorney, Agent, or Firm*—Birch, Stewart, Kolasch & Birch, LLP

(57) ABSTRACT

A woody synthetic resin molded article equivalent to natural wood in secondary processing properties such as nailing, sawing and screw clamping, excellent in strength/rigidity, and having no surface roughness to show good appearance can be stably formed by a woody synthetic resin composition containing 5 to 95 parts by weight of (A) a thermoplastic resin, 5 to 95 parts by weight of (C) a vegetable cellulose and, per 100 parts by weight of (A)+(C), 0.1 to 10 parts by weight of (B) an ultrahigh molecular weight polymer having a viscosity average molecular weight of 1,200,000 or more, wherein the thermoplastic resin (A) contains (J) a polyolefin resin composition.

20 Claims, No Drawings

WOODY SYNTHETIC RESIN COMPOSITIONS

TECHNICAL FIELD

The present invention relates to a woody synthetic resin composition and a woody synthetic resin molded article.

BACKGROUND ART

Wood flour-containing synthetic resin molded articles have hitherto been variously developed, and many molded articles obtained from compositions comprising a vinyl chloride resin, a polyolefin resin and wood flour have been known. Compositions comprising a polyolefin resin and wood flour are also disclosed, for example, in JP 55-131031 A, JP 57-115437 A, JP 62-39642 A, JP 2000-316352 A, JP 57-185351 A, JP 11-269316 A, JP 11-43562 A, JP 9-286880 A, JP 2000-38467 A, JP 2000-271909 A, JP 2002-11816 A and the like.

However, the techniques disclosed therein do not satisfy requirements such as productivity upon extruding resin compositions into molded articles, the material strength of the resulting molded articles, secondary processing properties such as nailing, sawing and screw clamping, and the surface appearance of the molded articles simultaneously, and have not been widely used as synthetic wood, such as for building materials, do-it-yourself materials, terraces and balconies.

In view of the above-mentioned conventional problems, an object of the invention is to provide a woody synthetic resin composition capable of stably forming a woody synthetic resin molded article which is suitable for uses such as building materials, do-it-yourself materials, terraces and balconies, and which is equivalent to natural wood in secondary processing properties such as nailing, sawing and screw clamping, excellent in strength/rigidity, free from surface roughness to show good external appearance, and is preferably further excellent in water resistance. Another object of the invention is to provide a woody synthetic resin molded article obtained by molding the woody synthetic resin composition.

DISCLOSURE OF THE INVENTION

The woody synthetic resin composition of the present invention comprises:
 5 to 95 parts by weight of (A) a thermoplastic resin;
 5 to 95 parts by weight of (C) a vegetable cellulose; and
 per 100 parts by weight of (A)+(C), 0.1 to 10 parts by weight of (B) an ultrahigh molecular weight polymer having a viscosity average molecular weight of 1,200,000 or more,
 wherein the thermoplastic resin (A) comprises (J) a polyolefin resin composition.

Further, the woody synthetic resin molded article of the invention is obtained by molding the above-mentioned woody synthetic resin composition.

BEST MODE FOR CARRYING OUT THE INVENTION

The invention will be described in detail below.

Woody Synthetic Resin Composition (A) Thermoplastic Resin

Although there is no particular limitation on the thermoplastic resin (A), those having a weight average molecular weight of 50,0000 to 500,000 are preferred. In terms of secondary processing properties, (J) a polyolefin resin composition is preferred among others. Of the polyolefin resin compositions (J), (D) a polyethylene resin or a mixture of (E) a polyolefin resin and (F) a styrene resin is preferred. Furthermore, the mixture of the polyolefin resin (E) and the styrene resin (F) is more preferred in terms of a balance between secondary processing properties and strength/rigidity.

As the polyolefin resin (E) used as a mixture with the styrene resin (F), there can be used, for example, polypropylene, an ethylene-propylene copolymer, the polyethylene resin (D) or the like, and the polyethylene resin is particularly preferred in terms of secondary processing properties.

As the polyethylene resin (D), there can be used, for example, high-density polyethylene, medium-density polyethylene, low-density polyethylene, a copolymer of ethylene and an α-olefin having 3 to 12 carbon atoms, an ethylenic polymer obtained by polymerization using any one of various new catalysts such as metallocene catalysts which have recently been developed, a mixture thereof or the like. Of these, high-density polyethylene, medium-density polyethylene and low-density polyethylene are preferably used, because they can be extruded at relatively low temperatures, so that the possible decomposition of vegetable cellulose during the molding of the woody synthetic resin composition can be inhibited. Further, high-density polyethylene, medium-density polyethylene and low-density polyethylene are also preferred in secondary processing properties. Furthermore, high-density polyethylene is extremely preferably used in that the rigidity and wear resistance of the woody synthetic resin molded article obtained by molding are excellent. In addition, polyethylene resins obtained by recycling various polyethylene resin products are also used as materials that are good in cost and provide a balance among performance characteristics.

Further, in order to obtain excellent mechanical strength and a good wood feeling, the melt index of the polyethylene resin (D) is preferably within the range of 0.01 to 5.0, and most preferably within the range of 0.05 to 3.0. The term "melt index" as used herein means that specified in ASTM D1238, and is measured at a measuring temperature of 190° C. under a load of 2160 g.

A melt index lower than the above-mentioned range may result in an inferior molding property, whereas a melt index higher than the above-mentioned range may result in inferior mechanical strength and shape stability upon molding. In order to adjust the melt index of the polyethylene resin within the preferred range, a method of blending polyethylene resins having different molecular weights can also be used.

The styrene resin (F) of the invention is a homopolymer comprising at least 50% by weight of aromatic vinyl monomer units represented by general formula (a), or a copolymer comprising such an amount of the aromatic vinyl monomer units with another copolymerizable vinyl monomer or with a rubbery polymer:

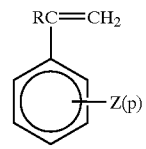

(a)

wherein R represents hydrogen, a lower alkyl or halogen, z is selected from the group consisting of a vinyl, hydrogen, a halogen and a lower alkyl, and p is an integer of 0 to 5.

Specific examples of the aromatic vinyl monomers for the homopolymer include styrene, α-styrene, 2,4-dimethylstyrene, monochlorostyrene, o-methylstyrene, p-methylstyrene, m-methylstyrene, p-tert-butylstyrene, ethylstyrene and the like. Further, the other vinyl monomers copolymerizable with the aromatic vinyl monomers include methacrylates such as methyl methacrylate and ethyl methacrylate, unsaturated nitrile compounds such as acrylonitrile and methacrylonitrile, acid anhydrides such as maleic anhydride, and the like. Furthermore, the rubbery polymers include a conjugated diene rubber, a partially hydrogenated diene rubber, a copolymer of a conjugated diene and an aromatic vinyl compound, an ethylene-propylene copolymer rubber and the like.

As the styrene resin (F), there can be used, for example, a polystyrene resin, an AS resin, an ABS resin or the like, and a polystyrene resin is preferred in terms of strength/rigidity among others.

Further, the polystyrene resin is preferably used because it is suitable for expansion molding which is effective for the purpose of imparting secondary processing properties such as nailing, sawing and screw clamping.

Of these polystyrene resins, polystyrene obtained by homopolymerizing styrene and impact-resistant polystyrene which is a copolymer of a conjugated diene and styrene can be preferably used, because they can be extruded at relatively low temperatures, so that the possible decomposition of vegetable cellulose during the molding of the woody synthetic resin composition can be inhibited.

Further, of these, polystyrene is more preferred because of its high rigidity.

Furthermore, polyethylene resins obtained by recycling various polyethylene resin products are also used as materials that are low in cost and provide a balance among performance characteristics.

The content of the thermoplastic resin (A) of the invention is from 5 to 95 parts by weight, preferably from 10 to 70 parts by weight, and more preferably from 15 to 50 parts by weight, per 100 parts by weight of the total (A)+(C) of the thermoplastic resin (A) and the vegetable cellulose (C). When the content of the thermoplastic resin is less than 5 parts by weight, a wood feeling is impaired and rigidity is inferior. Contents exceeding 95 parts by weight result in the occurrence of problems in processing properties.

When the thermoplastic resin (A) is a mixture of the polyolefin resin (E) and the styrene resin (F), the mixture is preferably a mixture of 5 to 99.9% by weight of the polyolefin resin (E) and 0.1 to 95% by weight of the styrene resin (F), and more preferably a mixture of 5 to 95% by weight of the polyolefin resin (E) and 5 to 95% by weight of the styrene resin (F). Further, a mixture of 10 to 90% by weight of the polyolefin resin (E) and 10 to 90% by weight of the styrene resin (F) is extremely preferred, and a mixture of 20 to 40% by weight of the polyolefin resin (E) and 60 to 80% by weight of the styrene resin (F) is most preferred.

(B) Ultrahigh Molecular Weight Polymer

By the addition of the ultrahigh molecular weight polymer, the productivity upon extrusion molding is improved, and also a woody synthetic resin molded article having a smooth surface and good appearance is obtained.

The viscosity average molecular weight measured by the viscosity method of the ultrahigh molecular weight polymer is 1,200,000 or more, preferably within the range of 1,500,000 to 15,000,000, and more preferably within the range of 4,000,000 to 10,000,000. When the viscosity average molecular weight is too low, the effect of improving the productivity upon extrusion molding is small. When the molecular weight is too high, dispersibility in extrusion molding is poor to possibly cause a problem in appearance.

The ultrahigh molecular weight polymers include polyethylene, polystyrene, polymethyl methacrylate, a styrene-butadiene block copolymer, a hydrogenated styrene-butadiene block copolymer, an alkyl methacrylate-alkyl acrylate copolymer, polyethylene tetrafluoride and the like, having a viscosity average molecular weight of 1,200,000 or more. In the invention, ultrahigh molecular weight polyethylene is preferably used in terms of the productivity upon extrusion molding and the appearance of the molded article.

The content of the ultrahigh molecular weight polymer is preferably from 0.1 to 10 parts by weight, and more preferably from 0.3 to 8 parts by weight, per 100 parts by weight of the total (A)+(C) of the thermoplastic resin (A) and the vegetable cellulose (C). Most preferably, it is from 0.5 to 6 parts by weight. When the content of the ultrahigh molecular weight polymer is less than 0.1 part by weight, the surface smoothness of the molded article is lost, and the productivity is extremely poor. Contents exceeding 10 parts by weight result in the possibility of causing a problem in the rigidity and impact resistance of the molded article.

In the invention, when the thermoplastic resin (A) is a mixture of the polyolefin resin (E) and the styrene resin (F), it is extremely preferred that the weight ratio (B)/(F) of the ultrahigh molecular weight polymer (B) to the styrene resin (F) is from 0.001 to 0.8. Further, it is most preferred that (B)/(F) is from 0.01 to 0.5.

However, in this case, it is based on the assumption that the content of the ultrahigh molecular weight polymer is within the range of 0.1 to 10 parts by weight.

(C) Vegetable Cellulose

The vegetable cellulose is not restricted, and examples thereof include wood flour, pulp, bagasse, kenaf, sawdust, wood fiber, chaff, crushed chip material, fruit shell flour, used paper, bamboo powder, brewer's grains, coffee grounds and the like. They can be used either singly or as a combination of two or more thereof. Although the vegetable cellulose can be appropriately selected according to the intended use, wood flour is preferred in terms of mechanical strength and secondary processing properties.

As the vegetable cellulose, there is preferably used one having a particle size of 0.1 mm to 10 mm which is powdered or granulated by dry or wet pulverizing or sieving sawdust, waste wood or the like as needed. When the particle size of the vegetable cellulose is smaller than the above-mentioned range, dusting or the like is liable to occur in handling thereof. Further, it takes a lot of time for pulverization or sieving, resulting in the possibility of increased cost. On the other hand, when the particle size is larger than the above-mentioned range, the mechanical strength of the resulting molded article possibly becomes insufficient.

The shape of the vegetable cellulose may be not only a granular shape, but also a flat shape, an irregular shape or a mixture thereof.

The vegetable cellulose alone or a mixture thereof with other compositions of the invention is preferably subjected to dehydration/drying treatment before extrusion molding.

As a means for drying the vegetable cellulose, there can be used a dryer for powder such as a hopper dryer or a paddle dryer.

Further, as a means for drying the vegetable cellulose in a state in which it is mixed with other compositions, drying can be carried out under conditions of ordinary pressure or reduced pressure, using a Henschel mixer, a Schuler mixer, a ribbon blender, a paddle dryer or the like.

When the vegetable cellulose is mixed with other compositions and dried before extrusion molding, it is preferred that coagulation of the composition is inhibited.

As a means for drying the vegetable cellulose, it is more preferred that deaeration is performed from a cylinder vent port or the like of an extruder under conditions of ordinary pressure or reduced pressure during extrusion molding, thereby conducting dehydration/drying treatment.

Further, the use of an active vegetable cellulose as the vegetable cellulose is preferred, because the water resistance of the molded article can be improved.

The active vegetable cellulose is a modified vegetable cellulose obtained by allowing the vegetable cellulose and (G) a modifier described below to react with each other by heating. In this case, the amount of the modifier reacting with the vegetable cellulose is referably from 0.1% by weight to 10% by weight, and more preferably from 0.5% by weight to 5% by weight. When the amount of the modifier exceeds 10% by weight, the unreacted modifier remains and possibly evaporates during extrusion molding. When it is less than 0.1% by weight, the water resistance of the molded article possibly becomes insufficient.

The active vegetable cellulose can be produced, for example, by heat mixing the vegetable cellulose and the modifier with each other in various mixers, thereby reacting them with each other at high efficiency. As the various mixers, there can be used various ordinary powder mixers. In particular, high-efficiency mixers such as a Henschel mixer, a Schuler mixer, a ribbon blender, or a paddle dryer are preferred. Further, in order to increase the contact efficiency of the vegetable cellulose with the modifier, it is preferred that the modifier is added in an atomized state to the reaction system. However, the modifier may also be added in a gaseous, liquid or solid state.

As for the reaction atmosphere, any of "under ordinary pressure", "under reduced pressure" or "under pressure" may be possible. However, it is desirable to conduct the reaction in the absence of liquid water, and the reaction is preferably conducted under such conditions that water generated during the reaction is removed from the reaction system (i.e., under dehydration conditions).

It is more preferred that the vegetable cellulose is reacted after drying by the above-mentioned method.

It is particularly preferred that the drying and reaction are conducted in the same mixer. Although the reaction temperature region of the reaction is within the range of room temperature to the decomposition temperature of the vegetable cellulose, it is usually preferably within the range of 100 to 200° C. Further, although the reaction time region of the reaction is usually within the range of 1 minute to 2 hours, it is generally within the range of 5 to 30 minutes. Furthermore, in order to avoid polymerization of the modifier during the reaction, it is preferred that the reaction atmosphere is appropriately selected, or that a polymerization inhibitor is added to the modifier. As the polymerization inhibitor, there can be used a general polymerization inhibitor such as hydroquinone, methoxyhydroquinone, p-benzoquinone, naphthoquinone or t-butylcatechol. It is recommended that the amount thereof used is within the range of 0 to 1% by weight, particularly 0.02 to 0.5% by weight, based on the weight of the modifier.

The content of the vegetable cellulose is from 5 to 95 parts by weight, preferably from 30 to 90 parts by weight, and more preferably from 50 to 85 parts by weight, per 100 parts by weight of the total (A)+(C) of the thermoplastic resin (A) and the vegetable cellulose (C). When the content of the vegetable cellulose is less than 5 parts by weight, a good wood feeling is not obtained. Contents exceeding 95 parts by weight result in decreased molding property and mechanical strength.

(G) Modifier

As the modifier (G) of the invention, there can be preferably used at least one functionalizing compound having at least one carbon-carbon double or triple bond, preferably carbon-carbon double bond, and at least one acyl oxide group, imino group, imido group or glycidyl group, preferably acyl oxide group, imido group or glycidyl group, in its molecular structure.

As the modifier (G), maleic anhydride, glycidyl acrylate or glycidyl methacrylate is preferred, and maleic anhydride is particularly suitable.

The use of the modifier is preferred in that water resistance is imparted to the molded article.

The content of the modifier (G) is preferably from 0.1 to 10 parts by weight, and more preferably from 0.3 to 8 parts by weight, per 100 parts by weight of the vegetable cellulose (C). Most preferably, it is from 0.5 to 6 parts by weight.

When the content of the modifier is more than the above-mentioned range, the problems possibly occur that the rigidity of the molded article decreases, and that the unreacted functionalizing compound evaporates during processing. Contents less than the above-mentioned range possibly result in insufficient water resistance.

(H) Modified Polyolefin Resin

In the invention, (H) a modified polyolefin resin can be used as a substituent for the modifier (G). The modified polyolefin resin (H) is a polyolefin resin modified with at least one of the modifiers (G) described above. Similarly to the case where the modifier (G) is used, the use thereof is preferred in that water resistance is imparted to the molded article.

As a specific production method for the modified polyolefin resin, it can be obtained by heating, melting and kneading a composition comprising 0.1 to 10 parts by weight of at least one of the modifiers (G) per 100 parts by weight of at least one polyolefin resin, at a temperature of about 140° C. to about 340° C. using a heating kneader such as an extruder.

As the production method for the modified polyolefin resin, when the melt kneading is conducted, 0.01 to 2 parts by weight of a radical initiator is preferably added, per 100 parts by weight of the polyolefin resin.

As the polyolefin resin used as a starting material for the modified polyolefin resin, there can be used, for example, those described for the thermoplastic resin (A).

The content of the modified olefin resin is preferably from 0.1 to 10 parts by weight, more preferably from 0.3 to 8 parts by weight, and most preferably from 0.5 to 6 parts by weight, per 100 parts of the vegetable cellulose (C).

(I) Foaming Agent

As a foaming agent, a foaming agent having a decomposition temperature of 120° C. to 180° C. is suitably used, because it is excellent in homogeneity of foam, and foams within the temperature range lower than the decomposition temperature of the vegetable cellulose so that the secondary processing properties and physical properties of the molded article are stabilized.

As such a foaming agent, there is suitably used a compound that generates an inert gas through decomposition, for example, a thermal decomposition type organic and/or inorganic foaming agent, because of excellent productivity. As the thermal decomposition type organic foaming agent, there is suitably used a foaming agent mainly generating nitrogen gas, including an azo compound such as azodicarbonamide, a nitroso compound such as N,N'-dinitrosopentamethylenetetramine, and a hydrazine derivative such as hydrazodicarbonamide, and as the thermal decomposition type inorganic foaming agent, there is suitably used a foaming agent mainly generating a carbon dioxide gas such as sodium bicarbonate, ammonium carbonate and ammonium bicarbonate. This is because they are excellent in the balance between the homogeneity of foam and the productivity. They can be used either singly or as a combination of two or more thereof.

Of these, sodium bicarbonate is particularly preferred because it is excellent in both the homogeneity of foam and the productivity.

Further, it is extremely preferred to use carbon dioxide gas or nitrogen gas per se. In this case, the foaming agent is preferably introduced into an extruder by side-feeding during extrusion molding.

The content of the foaming agent is from 0.1 to 10 parts by weight, and preferably from 0.3 to 5 parts by weight, per 100 parts by weight of the above-mentioned woody synthetic resin composition.

When the content of the foaming agent is less than 0.1 part by weight, the effect of foaming is low, and secondary processing properties are inferior. When it exceeds 10 parts by weight, the expansion ratio is too high, resulting in decreased mechanical strength and poor secondary processing properties.

Other Components

A filler may be added to the composition of the invention. As the filler, there can be used a granular inorganic filler such as talc or calcium carbonate, an inorganic fibrous filler such as glass fiber, or an organic fibrous filler such as polyester fiber. The effects of causing changes in dispersibility of the vegetable cellulose and in the surface state of the molded article or the like effect can also be expected by the blending of the filler. However, when the amount of the filler blended is too much, the molding property and mechanical strength are unfavorably decreased.

Further, in addition to the above-mentioned respective components, various additives such as a colorant, a lubricant, a stabilizer, a UV absorber, an antioxidant and an antistatic agent can be added as needed.

Preparation of Composition

In the preparation of the composition, first, as pretreatment, components (A) to (C) and preferably component (G) or (H) are added, and other necessary components are mixed by heating using a Henschel mixer or the like to remove water. In particular, when a vegetable cellulose (C) with a high water content is used, this pretreatment is preferably conducted.

Subsequently, component (I) is preferably added, and solidification can be carried out using an extruder, a Banbury mixer, a roll, an injection molding machine or various other molding machines.

If the contents placed in the Henschel mixer are heated to a high viscous melt state in the above-mentioned pretreatment, the Henschel mixer brings about over-torque, which may sometime lead to a state where further stirring is impossible. Accordingly, the preset temperature of the Henschel mixer is 90° C. or higher, and more preferably 120° C. or higher, and the upper limit thereof is 170° C. or lower, and more preferably 140° C. or lower.

Woody Synthetic Resin Molded Article

The woody synthetic resin molded article of the invention is obtained by molding the above-mentioned composition. As the molding methods, there can be used various molding methods which have hitherto been known, such as extrusion molding, injection molding and press molding. However, extrusion molding is preferred for high-precision control of the expansion ratio. Further, the molding can be conducted by extruding the composition mixed in a powder form directly. There is no particular limitation on the mold. However, it is preferred to use an insulated mold, preferably a fluororesin-coated mold, because the external appearance of the molded article surface can be more improved.

In the woody synthetic resin composition of the invention, the expansion ratio is controlled preferably within the range of 1.0 to 2.0, and more preferably within the range of 1.1 to 1.5. When the expansion ratio is too low, the composition is possibly inferior in secondary processing properties. When the expansion ratio is too high, there is a possibility that the mechanical strength is decreased and the secondary processing properties are inferior. The expansion ratio is controllable according to the kind and amount of the foaming agent to be added, and the temperature, mold and molding speed for the molding, and the like, and any method may be used.

EXAMPLES

The present invention will be illustrated in greater detail with reference to the following Examples. All the "parts" used in the Examples are intended to mean "given by weight".

Starting Materials

Starting materials used in the Examples are as follows.

The melt index of the high-density polyethylene used is a value measured at a measuring temperature of 190° C. under a load of 2160 g, in accordance with ASTM D1238.

Further, the viscosity average molecular weight of the ultrahigh molecular weight polyethylene used is the average molecular weight measured by a viscosity method. Specifically, it is the average molecular weight obtained by measuring the viscosity number using decahydronaphthalene, in accordance with DIN 53 728, sheet 4, and further carrying out the calculation using the following equation:

Martin's Equation $$\log \eta = \log[\eta] + K \cdot [\eta] \cdot c$$

$\eta$: Viscosity number
$[\eta]$: Intrinsic viscosity (dl/g)
K: 0.139 (g)
C: 0.03 (g/dl)

Margolies Equation $$M = 5.37 \cdot 10^4 [\eta]^{1.49}$$

M: Viscosity average molecular weight (A) Thermoplastic Resins

High-density polyethylene a (HDPEa)
  Suntec (registered trademark) HD B871 manufactured by Asahi Kasei Corporation
  Melt index: 0.35 g/10 min High-density polyethylene b (HDPEb)
  Suntec (registered trade mark) HD J340 manufactured by Asahi Kasei Corporation
  Melt index: 7.0 g/10 min Polystyrene (PS)
  680 manufactured by A & M Styrene Co., Ltd.

Polypropylene (PP)
  Sun Allomer (registered trademark) PS201A manufactured by Sun Allomer, Ltd.

AS resin (AS)
  Stylac (registered trademark) AS 789A manufactured by Asahi Kasei Corporation ABS resin (ABS)
  Stylac (registered trademark) ABS 121 manufactured by Asahi Kasei Corporation High-impact polystyrene (HIPS)
  H9152 manufactured by A &.M Styrene Co., Ltd.

(B) Ultrahigh Molecular Weight Polymers

Ultrahigh molecular weight polyethylene a (UHMWPEa)
  Sunfine (registered trademark) UH-950 manufactured by Asahi Kasei Corporation
    Viscosity average molecular weight: 4,500,000 Ultrahigh molecular weight polyethylene b (UHMWPEb)
  GUR (registered trademark) 4113 manufactured by TICONA GmbH
    Viscosity average molecular weight: 3,200,000

Ultrahigh molecular weight polyethylene c (UHMWPEc)
  GUR (registered trademark) 4150 manufactured by TICONA GmbH
    Viscosity average molecular weight: 7,300,000

Ultrahigh molecular weight polyethylene d (UHMWPEd)
  GHR (registered trademark) 8110 manufactured by TICONA GmbH
    Viscosity average molecular weight: 490,000

(C) Vegetable Celluloses

Wood flour a
  LIGNOCEL (registered trademark) S 150TR manufactured by J. RETTENMAIER & SOHNE GmbH & Co.

Wood flour b
  LIGNOCEL (registered trademark) P SUPER manufactured by J. RETTENMAIER & SOHNE GmbH & Co.

Active wood flour
  Wood flour a (60 kg) and 3 kg of modifier c described below were placed in a Henschel mixer, and stirred at high speed to elevate the internal temperature to 180° C. by shear heat generation, thereby conducting the reaction. Then, the reaction product was cooled to room temperature to obtain active wood flour.

(G) Modifier

Modifier a
  Maleic anhydride manufactured by Mitsubishi Chemical Corporation (H) Modified Polyolefin Resins Modified POa
  Polybond 3200 manufactured by Uniroyal Chemical Co., Inc.

Modified POb
  Umex 1010 manufactured by Sanyo Chemical Industries Ltd.

(I) Foaming Agents

Foaming Agent a
  Sodium hydrogen carbonate-based foaming agent, Cellborn (registered trademark) SC-P manufactured by Eiwa Chemical Ind. Co., Ltd.
  Decomposition temperature: 150° C.

Foaming Agent b
  Complex chemical foaming agent, Excellar (registered trademark) S#10 manufactured by Eiwa Chemical Ind. Co., Ltd.
  Decomposition temperature: 165° C.

Foaming Agent c
  Complex chemical foaming agent, foaming agent KS manufactured by Eiwa Chemical Ind. Co., Ltd.
  Decomposition temperature: 158° C.

Evaluation Methods
  Evaluation methods in the Examples are as follows:

(1) Bending Modulus
  Evaluation was made in accordance with ISO 178.

(2) Izod Impact Strength
  Evaluation was made using a test piece with no notch in accordance with ASTM D256.

(3) Water Absorption
  A test piece having the same shape as that of the test piece used in the measurement of the bending test modulus was put in an oven of 80° C. for 24 hours, and dried. Then, the weight was measured (this value was taken as X). Subsequently, the test piece was put in an oven with constant temperature and humidity of 80° C. and 95% RH for 24 hours, and allowed to absorb water. Then, the weight was measured (this value was taken as Y). Using the above-mentioned measured values, the following calculation was made to obtain the water absorbance $$\text{Water absorbance} = (Y-X)/X \times 100$$

(4) Expansion Ratio
  Using a test piece having the same shape as that of the test piece used in the measurement of the bending test modulus, the specific gravity (this value was taken as Z) was measured in accordance with ASTM D792. Subsequently, an extruded article was cut to a length of 5 cm in an extrusion direction, and the volume and weight thereof were measured (these values were taken as V and W), respectively. Then, the value derived from the following formula was taken as the expansion ratio of the examples.

$$\text{(Expansion ratio)} = V \times Z/W$$

(5) Occurrence Frequency of Defective Products (Hangnail-like Appearance Defect (Sasakure))
  With resin pellets obtained by the method described in each Example mentioned below, component (I) was mixed as needed to form a starting material for extrusion molding. A profile mold having a cross section of 38 mm×89 mm was attached to a PCM 65 type twin-screw extruder (manufactured by Ikegai Corporation), and the above-mentioned starting material for extrusion molding was extruded at a processing temperature of 175° C. The set conditions of the extruder were changed to investigate the maximum production speed conditions under which the occurrence frequency of defective products was stably low and molding could be performed without problems. The occurrence number of hangnail-like appearance defects per 100 m under these conditions was taken as the occurrence frequency of defective products.

(6) Maximum Production Speed (m/Hour)

The production speed under the conditions described in the above item, that is, the production speed under the maximum production speed conditions under which the occurrence frequency of defective products was stably low and wherein molding could be performed without problems was taken as the maximum production speed.

(7) Secondary Processing Properties

The secondary processing properties of a molded article were evaluated in accordance with the following criteria:

A: Easily cuttable with a saw, fixable by nailing and screwed shut without problems.

B: Difficult to be cut with a saw, and cracked by nailing/screw clamping.

Example 1

1) Preparation of Resin Pellets

As a pretreatment, 40 parts of high-density polyethylene a (HDPEa) as component (A), 5 parts of ultrahigh molecular weight polyethylene a (UHMWPEa) as component (B) and 55 parts of wood flour a as component (C) were put into a 500-liter Henschel mixer (manufactured by Mitsui Mining Co., Ltd.) set to 130° C., and water was removed with stirring.

The resulting mixed powder was melt kneaded with a co-rotating twin-screw extruder (manufactured by Toshiba Machine Co., Ltd., 30-mm diameter, L/D=31.5), and then, extruded in strand form and pelletized.

2) Preparation of Test Pieces and Evaluation

The resulting resin pellets were injection molded (manufactured by Toshiba Machine Co., Ltd., molding temperature: 190° C., mold temperature: 60° C.) to prepare physical property test samples compliant with ASTM Standards and ISO Standards.

Then, the above-mentioned bending modulus, Izod impact strength and water absorption were each evaluated. The evaluation results are shown in Table 3.

3) Preparation of Molded article

A hundred parts of the resulting resin pellets and 1 part of foaming agent a as component (I) were mixed with each other to prepare a starting material, and the occurrence frequency of defective products (hangnail-like appearance defects) and the maximum production speed were evaluated by the above-mentioned methods. As the profile mold, there was used a mold whose inner surface was coated with a fluororesin. The results thereof are shown in Table 3.

Examples 2 to 17, 21 and 23 to 26, and Comparative Examples 1 to 4

Test pieces by injection molding and molded articles by extrusion molding were obtained and evaluated in the same manner as in Example 1 with the exception that components (A) to (C) and component (I) were changed to the composition shown in Tables 1 and 2. The evaluation results thereof are shown in Table 3.

Examples 18 to 20 and 22

The pretreatment was conducted in the same manner as in Example 1 with the exception that component (G) or (H) was added to components (A) to (C) in the pretreatment process. Operations after the pretreatment were also carried out in the same manner as in Example 1 to obtain test pieces and molded articles, and evaluations were made.

Compositions of components (A) to (C) and components (G) to (I) used are as shown in Table 1.

The evaluation results are shown in Table 3.

Example 27

Test pieces by injection molding and a molded article by extrusion molding were obtained in the same manner as in Example 20 with the exception that a mold coated with no fluororesin was used in the preparation of the molded article, and evaluations were made. The evaluation results thereof are shown in Table 3.

Comparative Example 5

Test pieces by injection molding and a molded article by extrusion molding were obtained in the same manner as in Comparative Example 2 with the exception that a mold coated with no fluororesin was used in extrusion molding, and evaluations were made. The evaluation results thereof are shown in Table 3.

Example 28

Test pieces by injection molding and a molded article by extrusion molding were obtained in the same manner as in Example 20 with the exception that the pretreatment was not conducted in the preparation of the resin pellets, and evaluations were made. The evaluation results thereof are shown in Table 3.

TABLE 1

| | Starting Material for Pellets | | | | | | | | Additional Component in Extrusion Molding | |
|---|---|---|---|---|---|---|---|---|---|---|
| | (A) | | (B) | | (C) | | (G) or (H) | | (I) | |
| Ex. | Kind | Amt. (pts) | Kind | Amt. (pts) | Kind | Amt. (pts) | Kind | Amt. (pts) | Kind | Amt. (pts) |
| 1 | HDPEa | 40 | UHMW PEa | 5 | Wood flour a | 55 | — | — | Foaming Agent a | 1 |
| 2 | HDPEa 70 wt %/ PS 30 wt % | 40 | UHMW PEa | 5 | Wood flour a | 55 | — | — | Foaming Agent a | 1 |
| 3 | HDPEb 70 wt %/ PS 30 wt % | 40 | UHMW PEa | 5 | Wood flour a | 55 | — | — | Foaming Agent a | 1 |
| 4 | PP 70 wt %/ PS 30 wt % | 40 | UHMW PEa | 5 | Wood flour a | 55 | — | — | Foaming Agent a | 1 |

TABLE 1-continued

| | Starting Material for Pellets | | | | | | | | Additional Component in Extrusion Molding | |
|---|---|---|---|---|---|---|---|---|---|---|
| | (A) | | (B) | | (C) | | (G) or (H) | | (I) | |
| Ex. | Kind | Amt. (pts) | Kind | Amt. (pts) | Kind | Amt. (pts) | Kind | Amt. (pts) | Kind | Amt. (pts) |
| 5 | HDPEa 70 wt %/ HIPS 30 wt % | 40 | UHMW PEa | 5 | Wood flour a | 55 | — | — | Foaming Agent a | 1 |
| 6 | HDPEa 70 wt %/ AS 30 wt % | 40 | UHMW PEa | 5 | Wood flour a | 55 | — | — | Foaming Agent a | 1 |
| 7 | HDPEa 70 wt %/ ABS 30 wt % | 40 | UHMW PEa | 5 | Wood flour a | 55 | — | — | Foaming Agent a | 1 |
| 8 | HDPEa 50 wt %/ PS 50 wt % | 40 | UHMW PEa | 5 | Wood flour a | 55 | — | — | Foaming Agent a | 1 |
| 9 | HDPEa 30 wt %/ PS 70 wt % | 40 | UHMW PEa | 5 | Wood flour a | 55 | — | — | Foaming Agent a | 1 |
| 10 | HDPEa 30 wt %/ PS 70 wt % | 70 | UHMW PEa | 5 | Wood flour a | 25 | — | — | Foaming Agent a | 1 |
| 11 | HDPEa 70 wt %/ PS 30 wt % | 40 | UHMW PEa | 5 | Wood flour b | 55 | — | — | Foaming Agent a | 1 |
| 12 | HDPEa 70 wt %/ PS 30 wt % | 40 | UHMW PEa | 5 | Active wood flour | 55 | — | — | Foaming Agent a | 1 |
| 13 | HDPEa 70 wt %/ PS 30 wt % | 40 | UHMW PEa | 9 | Wood flour a | 55 | — | — | Foaming Agent a | 1 |
| 14 | HDPEa 80 wt %/ PS 20 wt % | 40 | UHMW PEa | 8 | Wood flour a | 55 | — | — | Foaming Agent a | 1 |
| 15 | HDPEa 70 wt %/ PS 30 wt % | 40 | UHMW PEa | 5 | Wood flour a | 55 | — | — | Foaming Agent b | 1 |
| 16 | HDPEa 70 wt %/ PS 30 wt % | 40 | UHMW PEa | 5 | Wood flour a | 55 | — | — | Foaming Agent c | 1 |
| 17 | HDPEa 70 wt %/ PS 30 wt % | 40 | UHMW PEa | 5 | Wood flour a | 55 | — | — | Foaming Agent a | 3 |
| 18 | HDPEa 70 wt %/ PS 30 wt % | 40 | UHMW PEa | 5 | Wood flour a | 55 | Modified POa | 3 | Foaming Agent a | 1 |
| 19 | HDPEa 30 wt %/ PS 70 wt % | 40 | UHMW PEa | 5 | Wood flour a | 55 | Modified POb | 3 | Foaming Agent a | 1 |
| 20 | HDPEa 70 wt %/ PS 30 wt % | 40 | UHMW PEa | 5 | Wood flour a | 55 | Modifier a | 3 | Foaming Agent a | 1 |
| 21 | HDPEa 70 wt %/ PS 30 wt % | 25 | UHMW PEa | 5 | Wood flour b | 70 | — | — | Foaming Agent a | 1 |
| 22 | HDPEa 70 wt %/ PS 30 wt% | 25 | UHMW PEa | 5 | Active wood flour | 70 | Modifier a | 3 | Foaming Agent a | 1 |
| 23 | HDPEa 70 wt %/ PS 30 wt % | 40 | UHMW PEa | 5 | Wood flour a | 55 | — | — | — | — |
| 24 | HDPEa 70 wt %/ PS 30 wt % | 40 | UHMW PEb | 5 | Wood flour a | 55 | — | — | Foaming Agent a | 1 |
| 25 | HDPEa 70 wt %/ PS 30 wt % | 40 | UHMW PEc | 5 | Wood flour a | 55 | — | — | Foaming Agent b | 1 |
| 26 | HDPEa 30 wt %/ HIPS 70 wt % | 40 | UHMW PEa | 5 | Wood flour a | 55 | — | — | Foaming Agent c | 1 |
| 27 | Same as in Example 20 | | | | | | | | | |
| 28 | Same as in Example 20 | | | | | | | | | |

TABLE 2

| | Starting Material for Pellets | | | | | | | | Additional Component in Extrusion Molding | |
|---|---|---|---|---|---|---|---|---|---|---|
| | (A) | | (B) | | (C) | | (G) or (H) | | (I) | |
| Com. Ex. | Kind | Amt. (pts) | Kind | Amt. (pts) | Kind | Amt. (pts) | Kind | Amt. (pts) | Kind | Amt. (pts) |
| 1 | PP | 40 | UHMW PEa | 5 | Wood flour a | 55 | — | — | Foaming Agent a | 1 |
| 2 | HDPEa 70 wt %/ PS 30 wt % | 40 | — | — | Wood flour a | 55 | — | — | Foaming Agent a | 1 |

TABLE 2-continued

| | Starting Material for Pellets | | | | | | | | Additional Component in Extrusion Molding | |
|---|---|---|---|---|---|---|---|---|---|---|
| | (A) | | (B) | | (C) | | (G) or (H) | | (I) | |
| Com. Ex. | Kind | Amt. (pts) | Kind | Amt. (pts) | Kind | Amt. (pts) | Kind | Amt. (pts) | Kind | Amt. (pts) |
| 3 | HDPEa 70 wt %/ PS 30 wt % | 40 | UHMW PEa | 15 | Wood flour a | 55 | — | — | Foaming Agent a | 1 |
| 4 | HDPEa 70 wt %/ PS 30 wt % | 40 | UHMW PEd | 5 | Wood flour a | 55 | — | — | Foaming Agent a | 1 |
| 5 | Same as in Comparative Example 2 | | | | | | | | | |

TABLE 3

| | Test Piece Obtained by Injection Molding | | | Molded article obtained by Extrusion Molding | | | | |
|---|---|---|---|---|---|---|---|---|
| | Bending Modulus (Mpa) | Izod Impact Strength (J/m) | Water Absorption (%) | Expansion Ratio | Occurrence Frequency of Defective Products (number/100 m) | Maximum Production Speed (m/hr) | Secondary processing Properties | |
| Ex. 1 | 4300 | 200 | 0.50 | 1.2 | 0.1 | 20 | A | |
| 2 | 5100 | 150 | 0.51 | 1.3 | 0.2 | 18 | A | |
| 3 | 5200 | 140 | 0.51 | 1.3 | 0.4 | 16 | A | |
| 4 | 5800 | 140 | 0.51 | 1.1 | 4 | 11 | A | |
| 5 | 5000 | 160 | 0.52 | 1.3 | 0.2 | 18 | A | |
| 6 | 6400 | 140 | 0.53 | 1.2 | 6 | 10 | A | |
| 7 | 6500 | 180 | 0.53 | 1.2 | 5 | 11 | A | |
| 8 | 6100 | 120 | 0.53 | 1.4 | 0.6 | 16 | A | |
| 9 | 6600 | 110 | 0.51 | 1.5 | 0.7 | 14 | A | |
| 10 | 4100 | 140 | 0.35 | 1.5 | 0.3 | 14 | A | |
| 11 | 5100 | 150 | 0.52 | 1.3 | 0.1 | 18 | A | |
| 12 | 5100 | 150 | 0.49 | 1.3 | 0.2 | 18 | A | |
| 13 | 4300 | 160 | 0.52 | 1.2 | 0.4 | 16 | A | |
| 14 | 4000 | 160 | 0.53 | 1.2 | 0.2 | 17 | A | |
| 15 | Same as in Example 2 | | | 1.3 | 0.3 | 17 | A | |
| 16 | Same as in Example 2 | | | 1.3 | 0.2 | 18 | A | |
| 17 | Same as in Example 2 | | | 1.7 | 0.9 | 11 | A | |
| 18 | 4800 | 150 | 0.40 | 1.3 | 0.1 | 18 | A | |
| 19 | 4900 | 160 | 0.39 | 1.3 | 0.1 | 18 | A | |
| 20 | 5000 | 160 | 0.37 | 1.3 | 0.1 | 19 | A | |
| 21 | 6200 | 100 | 1.03 | 1.1 | 0.5 | 13 | A | |
| 22 | 6100 | 110 | 0.81 | 1.1 | 0.4 | 14 | A | |
| 23 | Same as in Example 2 | | | — | 0.2 | 12 | A | |
| 24 | 5100 | 140 | 0.50 | 1.3 | 0.9 | 11 | A | |
| 25 | 5000 | 140 | 0.52 | 1.3 | 0.2 | 19 | A | |
| 26 | 6600 | 160 | 0.50 | 1.4 | 0.1 | 18 | A | |
| 27 | Same as in Example 20 | | | 1.3 | 0.5 | 14 | A | |
| 28 | Same as in Example 20 | | | 1.3 | 0.2 | 18 | A | |
| Com. Ex. 1 | 5300 | 180 | 0.50 | 1.1 | 12 | 6 | A | |
| 2 | 5300 | 140 | 0.50 | 1.3 | 20 | 5 | A | |
| 3 | 3800 | 150 | 0.51 | 1.2 | 0.1 | 18 | A | |
| 4 | 5200 | 140 | 0.50 | 1.3 | 11 | 8 | A | |
| 5 | Same as in Com. Example 2 | | | 1.3 | 45 | 3 | A | |

INDUSTRIAL APPLICABILITY

As described above, the resin composition of the invention is excellent in molding property, and the molded article obtained by molding the resin composition of the invention is equivalent to natural wood in secondary processing properties such as nailing, sawing and screw clamping, is excellent in strength/rigidity, has no surface roughness to show good external appearance, and can be suitably used for uses such as building materials, do-it-yourself materials, terraces and balconies.

Further, the molded article obtained by molding the resin composition of the invention in which (C) the vegetable cellulose is an active vegetable cellulose, or in which the composition contains (G) the modifier is more excellent in water resistance.

Furthermore, in the resin composition of the invention, it is also possible to use reworked materials as (A) the thermoplastic resin and (C) the vegetable cellulose. Accordingly, the resin composition is also excellent in recycling efficiency.

The invention claimed is:

1. A woody synthetic resin composition comprising:
   5 to 95 parts by weight of (A) a thermoplastic resin;
   5 to 95 parts by weight of (C) a vegetable cellulose; and
   per 100 parts by weight of (A)+(C), 0.1 to 10 parts by weight of (B) an ultrahigh molecular weight polymer having a viscosity average molecular weight of 1,200,000 or more,
   wherein the thermoplastic resin (A) comprises (J) a polyolefin resin composition.

2. The woody synthetic resin composition according to claim 1, wherein the polyolefin resin composition (J) comprises (D) a polyethylene resin.

3. The woody synthetic resin composition according to claim 1, wherein the polyolefin resin composition (J) comprises a mixture of 5 to 99.9% by weight of (E), a polyolefin resin and 0.1 to 95% by weight of (F) a styrene resin.

4. The woody synthetic resin composition according to claim 3, wherein the polyolefin resin composition (J) comprises a mixture of 5 to 95% by weight of (E), a polyolefin resin and 5 to 95% by weight of (F) a styrene resin, and wherein the weight ratio (B)/(F) of the ultrahigh molecular weight polymer (B) to the styrene resin (F) is from 0.001 to 0.8.

5. The woody synthetic resin composition according to claim 3, wherein the polyolefin resin (E) is (D) a polyethylene resin.

6. The woody synthetic resin composition according to claim 2 or 5, wherein the polyethylene resin (D) is high-density polyethylene.

7. The woody synthetic resin composition according to claim 3, wherein the styrene resin (F) is a polystyrene resin.

8. The woody synthetic resin composition according to claim 1, wherein the ultrahigh molecular weight polymer (B) is ultrahigh molecular weight polyethylene.

9. The woody synthetic resin composition according to claim 1, further containing, per 100 parts by weight of the vegetable cellulose (C), 0.1 to 10 parts by weight of (H) a modified polyolefin resin modified with at least one (G) modifier having, in its molecular structure, at least one carbon-carbon double or triple bond and at least one acyl oxide, imino, imido or glycidyl group.

10. The woody synthetic resin composition according to claim 1, wherein the vegetable cellulose (C) is an active vegetable cellulose obtained by heating 100 parts by weight of vegetable cellulose and 0.1 to 10 parts by weight of at least one (H) modified polyolefin resin beforehand to react with each other, the modified polyolefin resin (H) being modified with at least one (G) modifier having, in its molecular structure, at least one carbon-carbon double or triple bond, and at least one acyl oxide, imino, imino or glycidyl group.

11. The woody synthetic resin composition according to claim 1, further containing, per 100 parts by weight of the vegetable cellulose (C), 0.1 to 10 parts by weight of at least one (G) modifier having, in its molecular structure, at least one carbon-carbon double or triple bond, and at least one acyl oxide, imino, imido or glycidyl group.

12. The woody synthetic resin composition according to claim 9, 10 or 11, wherein the modifier (G) is maleic anhydride, glycidyl acrylate or glycidyl methacrylate.

13. A method for expansion-molding a woody synthetic resin, comprising extrusion-molding a composition comprising:
   the woody synthetic resin composition according claim 1; and
   0.1 to 10 parts by weight of (I) a foaming agent per 100 parts by weight of the woody synthetic resin composition.

14. The method for expansion-molding a woody synthetic resin according to claim 13, wherein the foaming agent (I) has a decomposition temperature of 120° C. to 180° C.

15. The method for expansion-molding a woody synthetic resin according to claim 13, wherein the foaming agent (I) is a compound that generates an inter gas through decomposition.

16. The method for expansion-molding a woody synthetic resin according to claim 13, wherein the foaming agent (I) is sodium bicarbonate.

17. The method for expansion-molding a woody synthetic resin according to claim 13, wherein the foaming agent (I) is nitrogen or carbon dioxide.

18. The method for expansion-molding a woody synthetic resin according to claim 13, comprising molding using an insulated mold.

19. The method for expansion-molding a woody synthetic resin according to claim 18, wherein the insulated mold is a fluororesin-coated mold.

20. A woody synthetic resin expansion-molded article obtained through molding in accordance with the woody synthetic resin expansion-molding method according to claim 13, and having an expansion ratio of 1.0 to 2.0.

* * * * *